(12) United States Patent
Bryce (10) Patent No.: US 10,809,060 B2
(45) Date of Patent: Oct. 20, 2020

(54) H-SHAPED SPIRIT LEVEL

(71) Applicant: Richard Bryce, Glasgow (GB)

(72) Inventor: Richard Bryce, Glasgow (GB)

( * ) Notice: Subject to any disclaimer, the term of this patent is extended or adjusted under 35 U.S.C. 154(b) by 229 days.

(21) Appl. No.: 15/770,373

(22) PCT Filed: Sep. 22, 2016

(86) PCT No.: PCT/GB2016/052954
§ 371 (c)(1),
(2) Date: Apr. 23, 2018

(87) PCT Pub. No.: WO2017/068319
PCT Pub. Date: Apr. 27, 2017

(65) Prior Publication Data
US 2018/0306579 A1   Oct. 25, 2018

(30) Foreign Application Priority Data

Oct. 23, 2015 (GB) .................................. 1518795.8

(51) Int. Cl.
*G01C 9/28* (2006.01)
*G01C 9/34* (2006.01)

(52) U.S. Cl.
CPC ........ *G01C 9/28* (2013.01); *G01C 9/34* (2013.01)

(58) Field of Classification Search
CPC ..................................... G01C 9/28; G01C 9/34
USPC ................... 33/374, 375, 381, 451
See application file for complete search history.

(56) References Cited

U.S. PATENT DOCUMENTS

| 1,238,833 | A | * | 9/1917 | Shelby et al. | ........... | G01C 9/26 |
|---|---|---|---|---|---|---|
| | | | | | | 33/332 |
| 1,462,231 | A | | 7/1923 | Fouse | | |
| 2,752,692 | A | * | 7/1956 | Smith | ....................... | G01C 9/26 |
| | | | | | | 33/374 |
| 2,807,888 | A | * | 10/1957 | Thomas | .................... | G01C 9/28 |
| | | | | | | 33/374 |

(Continued)

FOREIGN PATENT DOCUMENTS

| EP | 1630522 A1 | 3/2006 |
|---|---|---|
| FR | 2538539 A1 | 6/1984 |

(Continued)

OTHER PUBLICATIONS

ISA/EPO, International Search Report and Written Opinion dated Dec. 13, 2016 for International Application No. PCT/GB2016/052954, 11 pages.

*Primary Examiner* — George B Bennett
(74) *Attorney, Agent, or Firm* — Umberg Zipser LLP (57) ABSTRACT

A spirit level comprising a generally central elongate bar (1), and at least one pair of arm members (6) pivotally coupled at a respective end of said bar for movement between a first, extended, generally H-shaped configuration in which said arm members (6) extend from said end of side bar at an angle thereto, and a second folded configuration, in which a side-wall of each of said arm members (6) is substantially parallel to and located against or adjacent to a side edge of said central bar, wherein at least one bulb (2) containing a bubble is provided in or on said central bar (1) and oriented substantially parallel to its longitudinal axis, and at least one bulb (2) containing a bubble is provided in or on an arm member (6) and oriented substantially parallel to its longitudinal axis.

12 Claims, 8 Drawing Sheets

(56) References Cited

U.S. PATENT DOCUMENTS

| | | | | |
|---|---|---|---|---|
| 2,810,198 A * | 10/1957 | Wilson | G01C 9/28 | 33/342 |
| 2,878,569 A * | 3/1959 | Metrulis | G01B 3/04 | 33/451 |
| 3,180,036 A * | 4/1965 | Meeks, Sr. | E04F 21/00 | 33/347 |
| 3,820,249 A * | 6/1974 | Stone | G01C 9/24 | 33/347 |
| 4,523,384 A * | 6/1985 | Giacomini | G01B 5/207 | 33/288 |
| 4,607,437 A | 8/1986 | McSorley, Sr. | | |
| 4,928,395 A | 5/1990 | Good | | |
| 5,459,935 A * | 10/1995 | Paulson | G01B 3/566 | 33/451 |
| 5,713,135 A * | 2/1998 | Acopulos | G01B 3/56 | 33/1 PT |
| 5,881,468 A * | 3/1999 | Baumann | G01C 9/28 | 33/383 |
| 6,279,240 B1 * | 8/2001 | Bonaventura, Jr. | G01C 9/26 | 33/374 |
| 6,836,973 B1 * | 1/2005 | Eccles, Jr. | G01C 9/28 | 33/374 |
| 7,155,840 B1 * | 1/2007 | Carbonaro | A47G 1/205 | 33/451 |
| 7,797,848 B2 * | 9/2010 | Cobb | G01C 9/26 | 33/374 |
| 9,116,026 B1 | 8/2015 | Parker | | |
| 2006/0123644 A1 * | 6/2006 | Szumer | G01C 9/28 | 33/374 |
| 2010/0000107 A1 * | 1/2010 | Cobb | G01C 9/26 | 33/374 |
| 2018/0010912 A1 * | 1/2018 | Captarencu | G01C 9/28 | |

FOREIGN PATENT DOCUMENTS

| | | |
|---|---|---|
| GB | 2389655 A | 12/2003 |
| GB | 2470239 A | 11/2010 |

* cited by examiner

H-SHAPED SPIRIT LEVEL

This invention relates to a spirit level and, more particularly, to a spirit level configured to determine the inclination of a surface, in substantially mutually perpendicular directions.

Spirit levels of various configurations having the capability to determine the inclination of a surface along multiple degrees of freedom are known. For example EP1630522 describes a spirit level comprising an H-shaped frame formed of two mutually parallel arms connected by a perpendicular cross member. The lower surfaces of the arms and cross member are substantially flat and configured to be placed on the surface to be examine. The upper, opposing surfaces of the arm(s) and cross member are provided with respective bulbs, each comprising a glass tube that contains a liquid in which an air bubble floats, and mounted within a recess in the respective arm/cross-member. The bulb on the arm(s) and cross member are mutually perpendicularly oriented, such that they determine whether the surface is level (or plumb) in two mutually perpendicular directions.

However, a significant problem associated with the above-described arrangement is that its size, weight and shape can make it unwieldy to handle and very inconvenient to store for transport.

Aspects of the present invention seek to address at least some of the above-mentioned issues and, in accordance with a first aspect of the present invention, there is provided a spirit level, comprising a generally central elongate bar, and at least one pair of arm members pivotally coupled at a respective end of said bar for movement between a first, extended, generally H-shaped configuration in which said arm members extend from said end of side bar at an angle thereto, and a second folded configuration, in which a side-wall of each of said arm members is substantially parallel to and located against or adjacent to a side edge of said central bar, wherein at least one bulb containing a bubble is provided in or on said central bar and oriented substantially parallel to its longitudinal axis, and at least one bulb containing a bubble is provided in or on an arm member and oriented substantially parallel to it's longitudinal axis.

In one exemplary embodiment of the present invention, there may be provided a spirit level wherein one or more of said arm members may comprise a respective extension member, mounted for movement relative thereto between a first, retracted position and a second, extended position wherein it forms an extension to the length of said respective arm member.

The above-mentioned extension member may be slidably mounted on a respective arm member such that longitudinal sliding movement relative thereto, between said first and second positions, is possible.

The extension member may comprise an elongate longitudinal slot by which said extension member may be mounted on a protrusion provided on said respective arm member, wherein said sliding movement may be effected, in use, by sliding a side edge of said slot longitudinally over said protrusion.

Additionally, in one exemplary embodiment of the present invention, there may be a spirit level, wherein each arm member may be mounted at a respective end of said central bar by means of a hinge member.

The hinge member may be substantially cuboidal with a semi-cylindrical portion, wherein said semi-cylindrical portion may comprise a hole through the depth of the hinge for the accommodation of a fastener.

According to one exemplary embodiment of the invention the arm members may be coupled to the respective end of said central bar such that they may lie substantially flush against said central bar when in said second configuration, and substantially perpendicular relative to the longitudinal axis of the central bar, when in said first configuration.

Optionally, the invention may comprise a releasable holding means for releasably holding said arm members in said second configuration.

In one exemplary embodiment the releasable holding means may comprise a first magnetic portion provided on a side edge of said central bar and a second magnetic portion provided on an arm member, on said side edge located against or adjacent to said side edge of said central bar, when in said second configuration.

Each arm member may comprise a distal end and a proximal end and may be pivotally coupled at its respective proximal end to an end of said central bar so it may be pivotal toward and away from a respective one of the opposing longitudinal side edges of said central bar.

The invention may, in one exemplary embodiment, be such that the proximal ends of each of a pair of arm members are substantially flush with each other when in a first configuration.

One exemplary embodiment may provide the proximal ends of one or both of a pair of arm members with a friction surface for enabling said proximal ends to engage with each other, in a friction fit, when said arm members are in said first configuration.

Furthermore, the above-mentioned friction surface may further comprise a serrated surface.

These and other aspects of the present invention will be apparent from the following specific description, and embodiments of the present invention will now be described, by way of examples only, and with reference to the accompanying drawings, in which.

Figure 1:
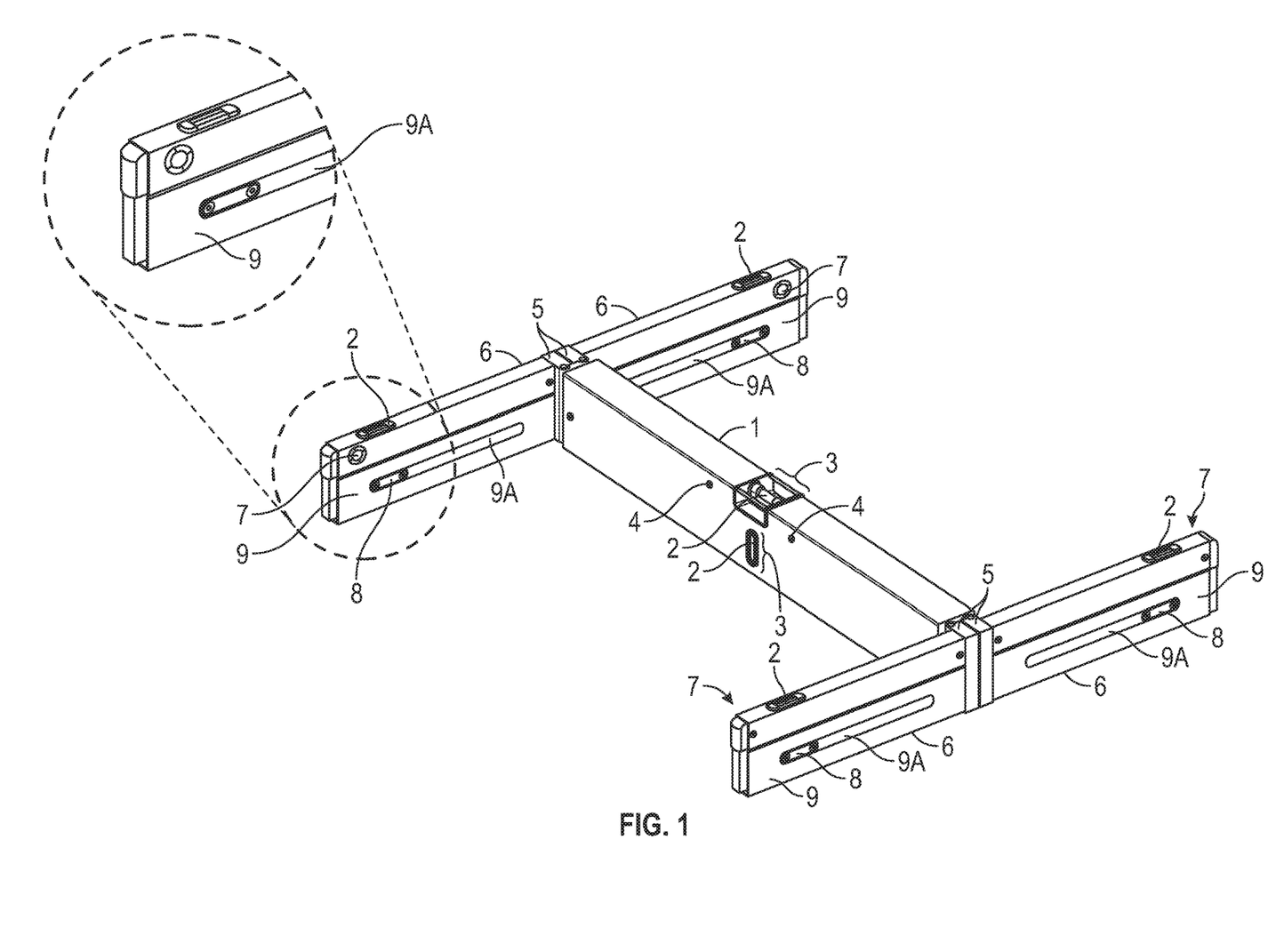
FIG. 1 is an isometric schematic diagram showing a spirit level according to an exemplary embodiment of the invention in a first configuration, wherein the arms are substantially perpendicular to the central bar, and the extendable portions are retracted fully.
Figure 2A:
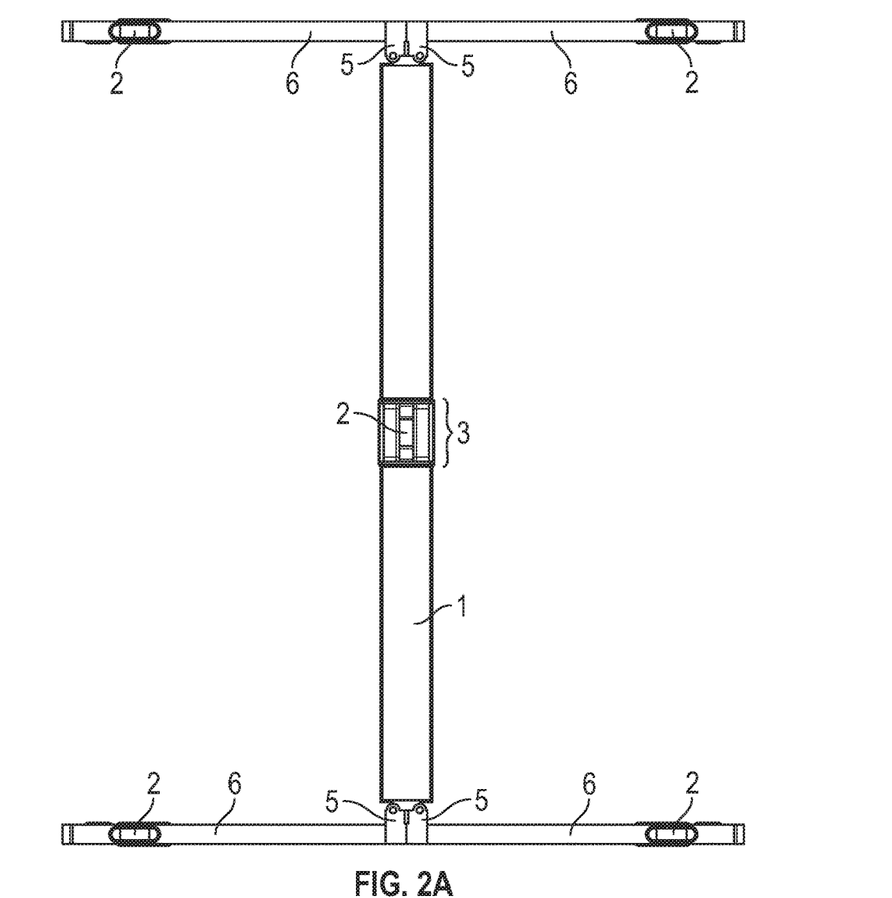
FIG. 2A is a schematic plan view of the spirit level of FIG. 1, in the aforementioned configuration.
Figure 2B:
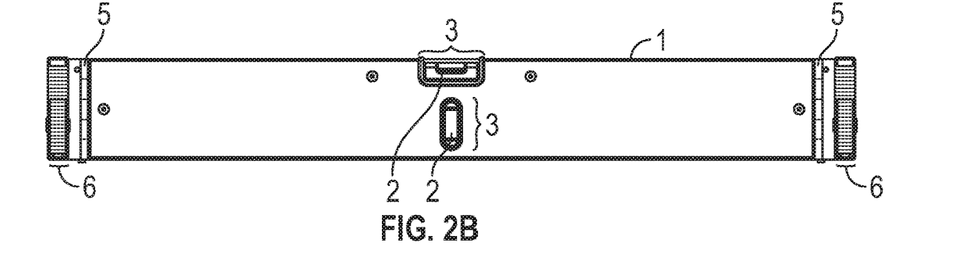
FIG. 2B is a schematic side view of the spirit level of FIG. 1, in the aforementioned configuration.
Figure 6A:
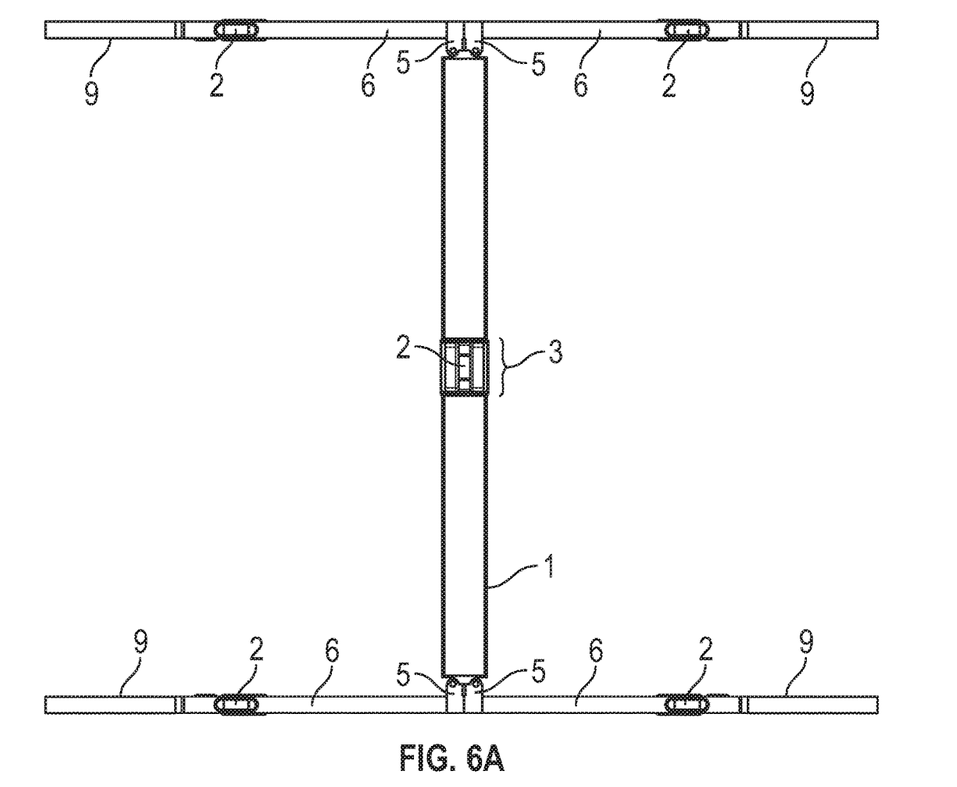
FIG. 6A is a schematic plan view of the spirit level of FIG. 5, in the aforementioned configuration.
Figure 6B:
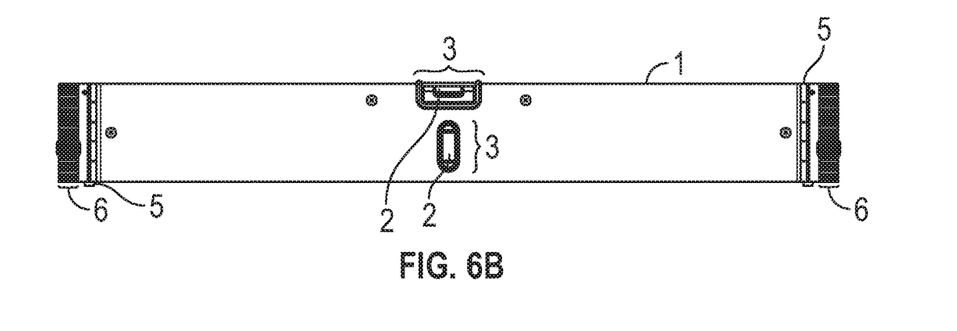
FIG. 6B is a schematic side-view of the spirit level of FIG. 5, in the aforementioned configuration.

Referring to FIGS. 1, 2B and 6B of the drawings, a spirit level according to an exemplary embodiment of the present invention comprises a central bar 1, which may comprise a top, two sides, two ends and a base. In the example shown in the drawings the top and base are of an equal width which is less than the width of the sides, but the invention is in not necessarily intended to be limited to this particular shape. In one exemplary embodiment there may be included within a recess 3 along the length of the central bar, an elongate bulb 2 which may be filled with a liquid and a gas bubble, the recess 3 providing for the user a line of sight to the elongate bulb 2 such that a reading or measurement may be taken. The elongate bulbs 2 may have on them, markings such that a user can determined if the surface on which the device is level (horizontal) or plumb (vertical) according to the location of a bubble therein relative to the markings.

In one exemplary embodiment of the present invention the central bar may house two such elongate bulbs 2 in recesses 3, one to be viewed from above and one to be viewed from the side. Each bulb 2 contains liquid and a bubble such that when viewed, a user can determine which way is down. The bulb 2 on the side of the central bar 1 may be able to give an indication of the vertical incline of the surface, while the bulb 2 on the top of the central bar 1 may give a reading of the horizontal flatness along the direction defined by the length of the bar.

Referring to FIGS. 1 and 2A, at each end of the central bar 1, there is provided a respective pair of arm members 6 attached to the central bar 1 by means of hinges 5. Each hinge 5 may be positioned such that it extends out of the side of the arm 6 facing the central bar 1, such that when the arm members 6 are in a first configuration, the ends of each arm member are able to lie flush against each other and extend substantially perpendicular to the central bar 1 such that, in the first configuration illustrated, each pair of arm members 6 defined a single perpendicular arm across a respective end of the central bar 1 and, together, the central bar 1 and the two pairs of arm members 6 define a generally H-shaped structure.

Figure 2C:
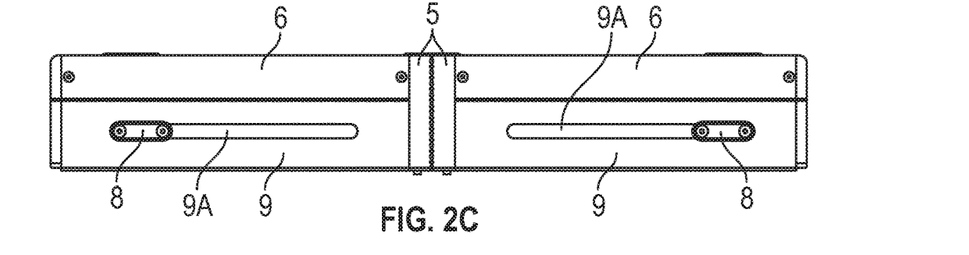
FIG. 2C is a schematic diagram end view of the spirit level of FIG. 1, in the aforementioned configuration.

Referring to FIGS. 1 and 2C, each arm member 6 is provided with an extension member 9 of generally U-shaped cross-section, which is slidably mounted over the lower edge of a respective arm member 6. Each extension member 9 includes a protrusion 8, which may be generally T-shaped, which is mounted within an elongate recess of slot 9A in the side wall of the extension member 9

The protrusion 8, in this exemplary embodiment, is generally T-shaped, oriented with the narrow end attached to the arm 6, and constructed such that the 'bar' of the 'T' is wider than the width of the slot such that the extension member 9 may not slip off.

In the aforementioned first configuration, the extension member 9 is fully retracted and its entire length rests against the arm member 6. However, in a second configuration (as shown in FIG. 5 of the drawings) the extension member 9 can be slidably and longitudinally extended beyond the distal end of the respective arm member 6 (as the edges of the slot 9A slide over the protrusion 8) to effectively extend the length.

Figure 3:
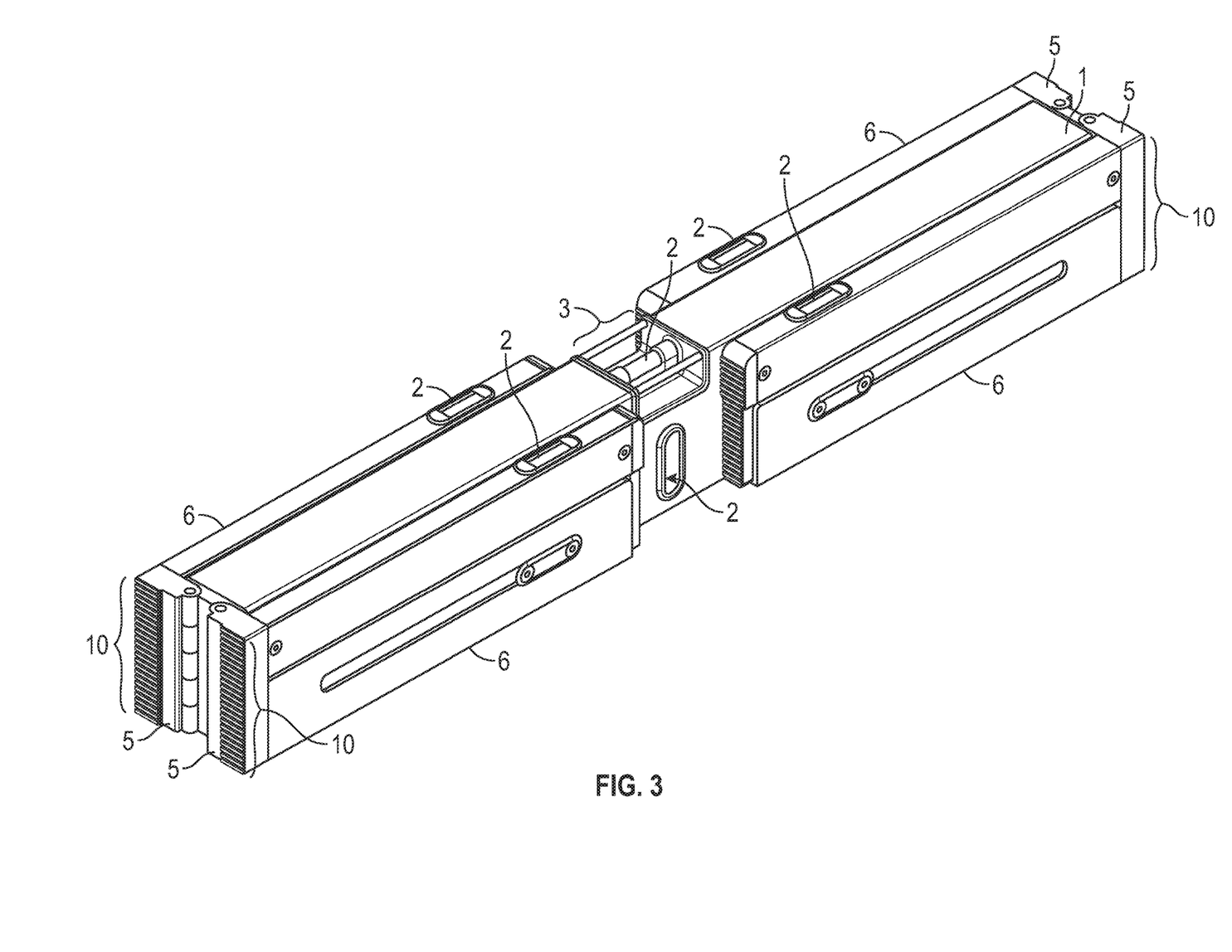
FIG. 3 is an isometric schematic drawing of the spirit level of FIG. 1 in a second configuration, wherein the arms are folded in so as to lie parallel to the central bar, and the extendable portions are retracted fully.
Figure 4A:
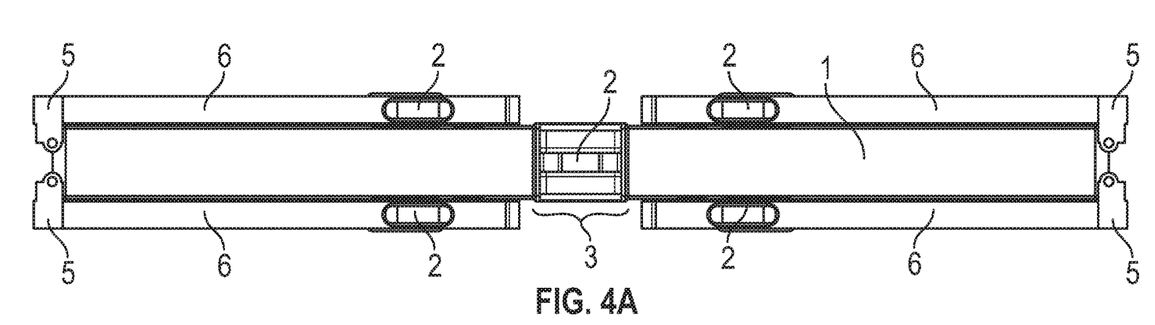
FIG. 4A is a schematic plan view of the spirit level of FIG. 3, in the aforementioned configuration.
Figure 4B:
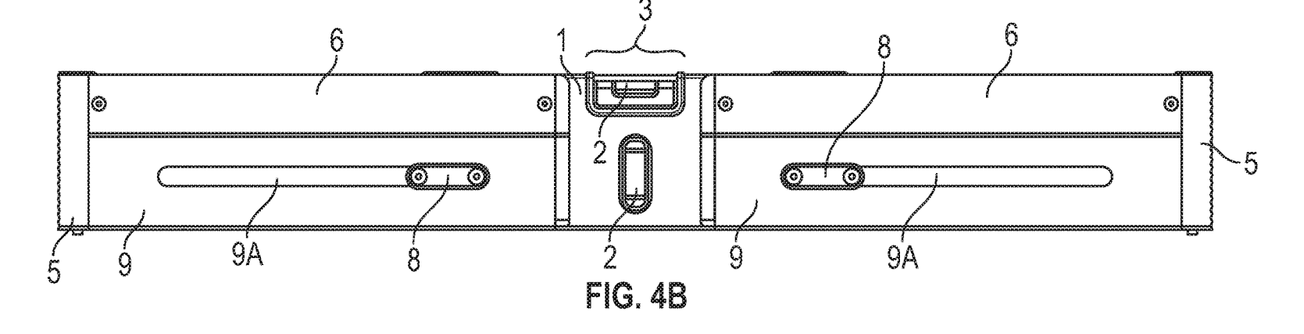
FIG. 4B is a schematic side view of the spirit level of FIG. 3, in the aforementioned configuration.
Figure 4C:
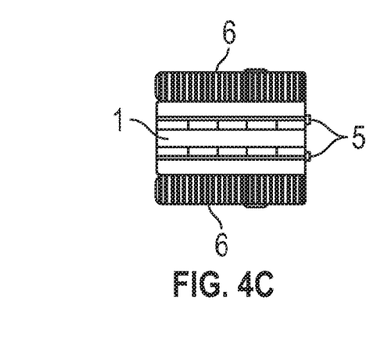
FIG. 4C is a schematic end view of the spirit level of FIG. 3, in the aforementioned configuration.

Referring to FIG. 3, the spirit level is illustrated in a second configuration, in which the arm members 6 have been folded in to meet the central bar 1. Referring to FIG. 1, there may be provided along the length of the side of the central bar 1, at least two magnets 4, positioned such that they line up with corresponding magnets 7 on the inner side of the arm members 6. If an arm member 6 is pushed in toward the central bar 1 and the magnets 4 in order to move it into a second configuration, the corresponding magnets 7 on the respective arm member 6 will interact such that the arm member 6 is effectively pulled in toward the central bar 1, until an opposing (manual) force pulls the arm member 6 out again. This has the effect of locking the arm members 6 into the second configuration, without providing too much resistance that a user will not be able to pull them out again. Thus, the arm members 6 cannot swing out and cause damage, and the risk of damage thereto is consequently reduced.

Figure 5:
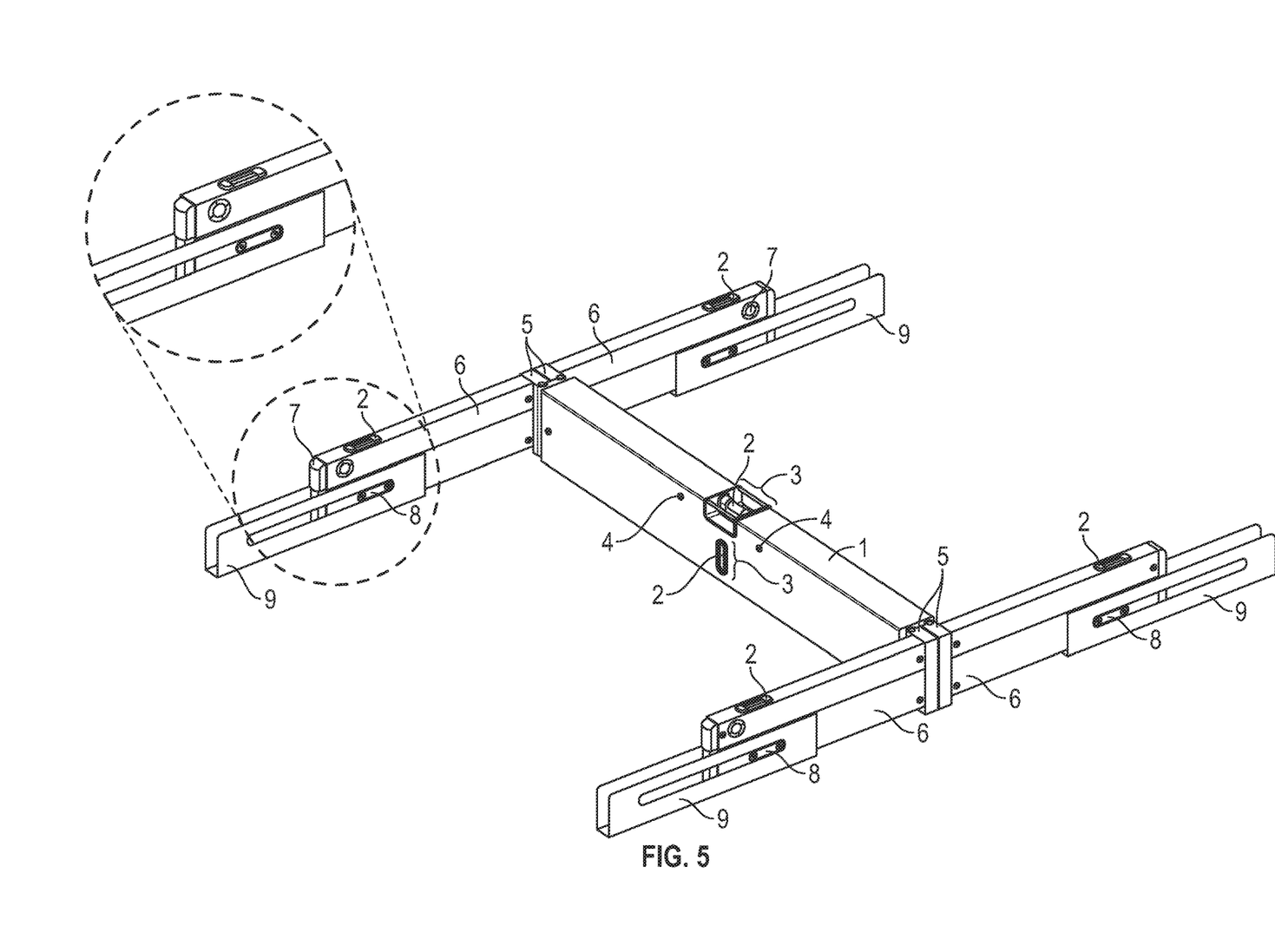
FIG. 5 is an isometric schematic diagram of the spirit level of Figure in a third exemplary configuration, wherein the arms are substantially perpendicular to the central bar, and the extendable portions are extended to their maximum capacity.
Figure 6C:
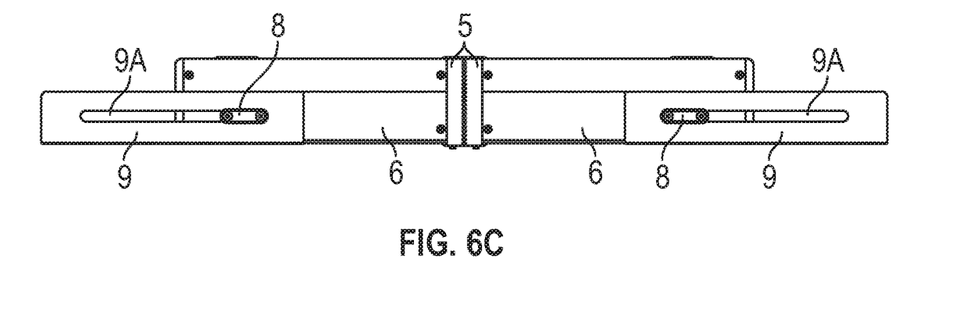
FIG. 6C is a schematic end view of the spirit level of FIG. 5, in the aforementioned configuration.

Referring to FIGS. 5, 6A and 6C, the spirit level is illustrated in a second configuration, in which the extension members 9 are fully extended. When in this configuration, the extension members 9 have the effect of providing further stability to the device by increasing the "resting" surface area. Since in this configuration the invention is covering a larger area of the surface needing to be measured, it can provide a more general reading of the entire surface.

In one exemplary embodiment, referring to FIG. 1, 3 or 5 of the drawings, the invention may comprise at least six elongate bulbs 2, the first of which may be located within a recess 3 on the top surface of the central bar 1 as described above and oriented such that the elongate bulb 2 lies parallel to the longitudinal axis of the central bar 1. A second elongate bulb 2 may be located substantially centrally along the length and width of the central bar and oriented such that it lies perpendicular to the longitudinal axis of the central bar 1, furthermore there may be recesses on both sides of the central bar such that the second bulb 2 may be viewed from either side. As described above, the user may use the device to make a determination of the level (horizontal) or plumb (vertical) of the surface on which the device is resting in two directions, namely, vertically and laterally.

Still referring to FIG. 1, 3 or 5, the other four elongate bulbs 2 may be located in recesses 3 situated near the distal end of each arm member 6, i.e. the end furthest from the hinges 5. These elongate bulbs 2 may be oriented such that they lie parallel with the longitudinal axis of the respective arm member 6. In said first or third configuration, as shown in FIGS. 1 and 5 respectively, these elongate bulbs are such that they are perpendicular to both the bulbs located within the central bar. This enables a user to make a determination of inclination in three perpendicular directions, one vertical and two horizontal.

Referring to FIGS. 3, 4A, 4B and 4C of the drawings, in a second configuration the arm members 6 of the invention and the extension members 9 of the spirit level are retracted and folded in fully, thereby making it easier to pack away into, for example, a tool box or a car. In one exemplary embodiment there may be provided a protective case for the invention, helping to protect the invention from impacts or scratches and, therefore, extending its lifetime.

Referring only to FIG. 3, there is provided a serrated surface 10 on the end of each arm member 6 (closest to the hinge 5). The serrated surfaces 10 at adjacent ends of the arm members 6 correspond such that when the spirit level is in a first or second configuration, they interlock, thereby providing a substantial amount of friction and ensuring that the two adjacent arm members 6 do not move relative to each other. This is advantageous in that it enables a more accurate determination of inclination of a surface to be made.

Figure 7:
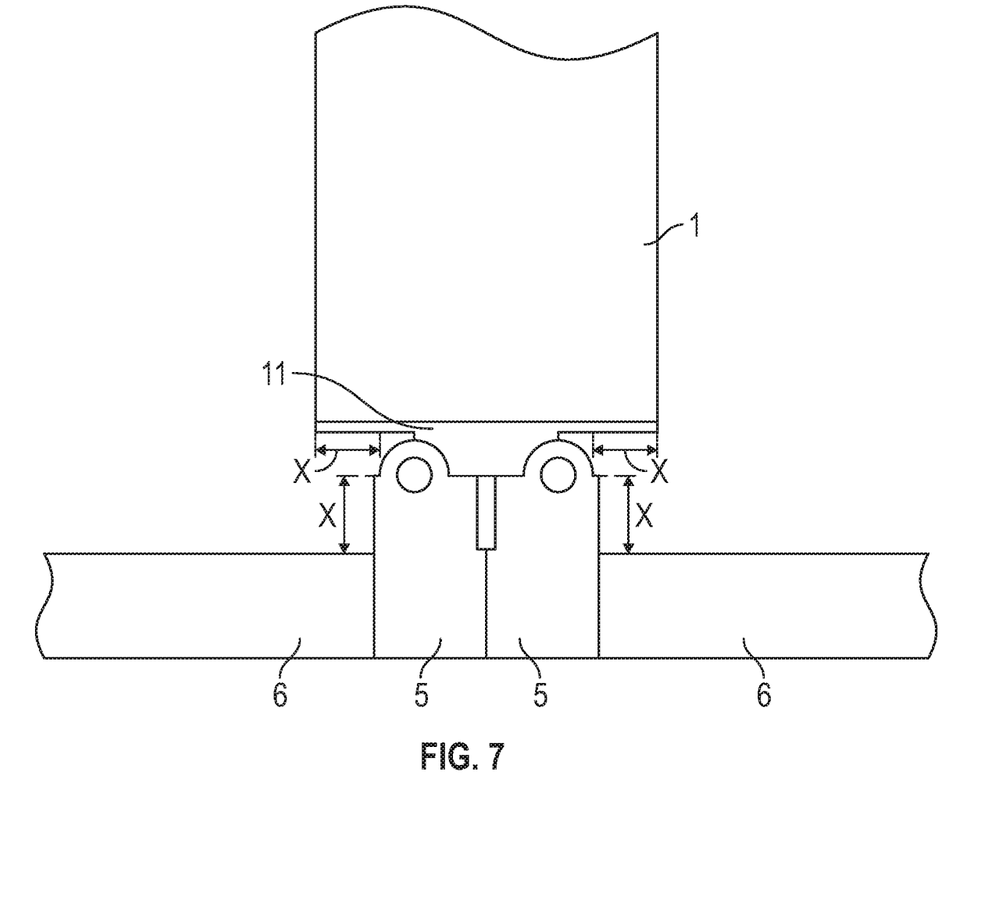
FIG. 7 is a schematic diagram showing a close up of the top view of a pair of hinges located at either end of the central bar of a spirit level according to an exemplary embodiment of the present invention, in any of the aforementioned configurations.

The hinges themselves may be of a shape which provides support to the structure in certain configurations. Referring to FIG. 7 there is shown a close up of the hinges 5 as viewed from above. They may comprise a cuboidal main body, with a semi-cylindrical portion made up from the alternating knuckles, which has a hole through the geometric centre of the semi-cylinder which may accommodate a screw, pin or other fastening piece. These semi-cylindrical portions are the pivot points of the hinges 5 and are oriented such that they face the end of the central bar 1. In between the end of the central bar 1 and the hinges 5 there may be a stopper 11 made from a hard material, such as a rigid plastic, which follows the same shape of the cylindrical shaped portion of both adjacent hinges, and is flat in between. This acts as a barrier for the arm members 6, providing extra resistance such that the arms 6 may not fold out any further than the stopper 11 allows. This ensures the arm members 6 are substantially parallel to each other and substantially perpendicular to the central bar 1 at maximum extension.

When the arm members 6 are in a configuration as portrayed in FIG. 7, there may be a gap between the two adjacent sides of the hinges 5. This gap may extend part way down the length of each hinge 5 and all the way down its depth. This allows the inner corners of the hinges 5 to be able to move past each other without collision, collisions may result in damage to the invention or inability to move the invention between two different configurations. The arm member 6 has a width of substantially enough such that when the arms are in a second configuration (as shown is FIG. 3), the arm lies flush against the central bar 1, and the hinge 5 lies flush against the end of the central bar. Distances marked with an 'x' are equal.

Figure 8:
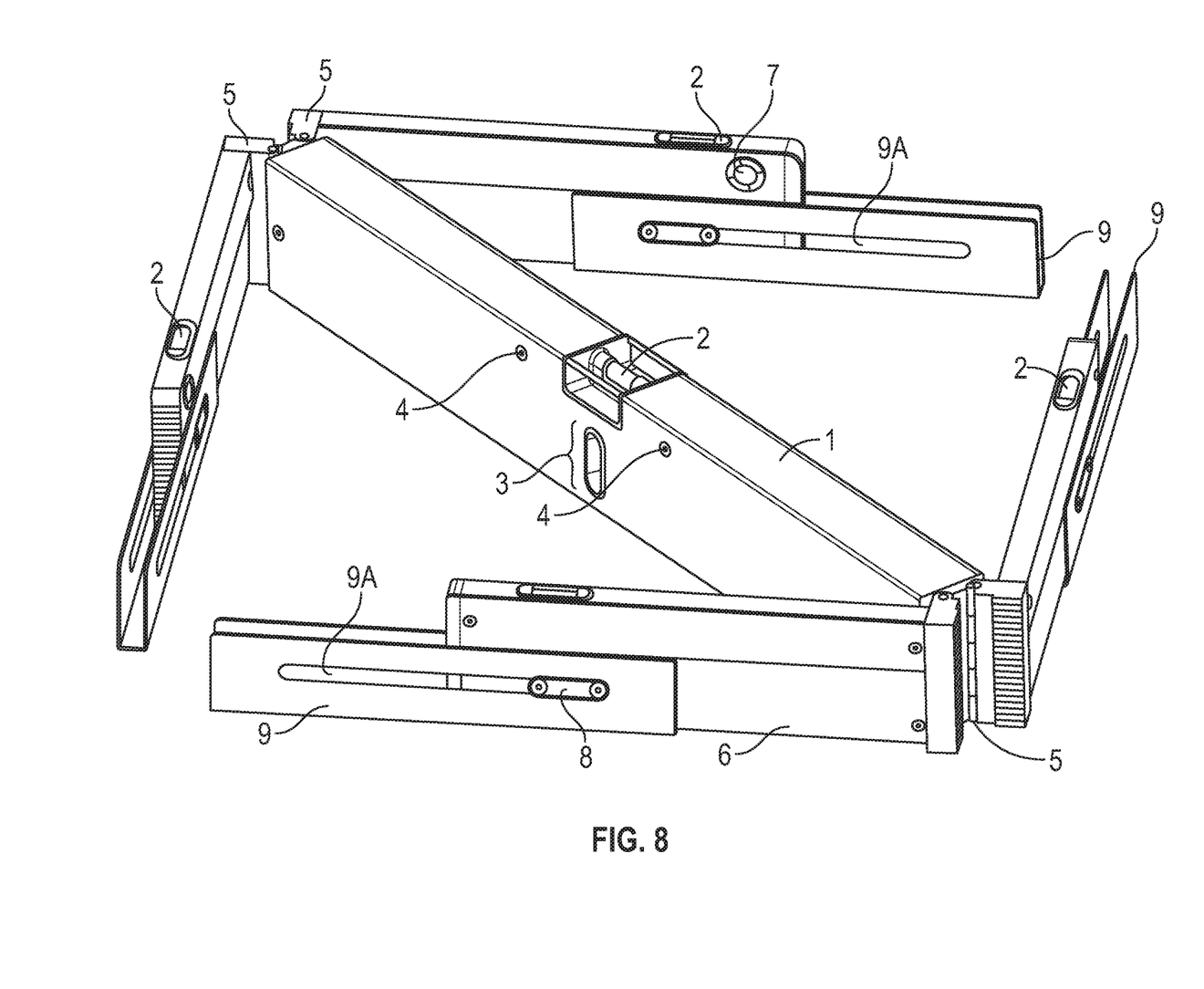
FIG. 8 is an isometric schematic diagram of a spirit level according to an exemplary embodiment of the present invention, in a further, optional, configuration.

Optionally, and referring to FIG. 8 of the drawings the arm members 6 of the spirit level may be folded out at other angles to the central bar, e.g. 45 degrees, thereby defining further configurations to suit the needs of the user. They may also be folded out at different angles to each other, providing the user with many options and increasing the number of different situations in which it can be effectively and conveniently used.

From the description laid out above it will be apparent to someone skilled in that art that variations and adaptations can be made to the described embodiments without departing from the scope of the invention as defined in the appended claims.

The invention claimed is:

1. A spirit level comprising a generally central elongate bar, and two pairs of arm members, each pair being pivotally coupled at a respective end of said bar for movement between a first, extended, generally H-shaped configuration in which said arm members extend from said end of said bar at an angle thereto, and a second folded configuration, in which a side-wall of each of said arm members is substantially parallel to and located against or adjacent to a side edge of said central bar, wherein at least one bulb containing a bubble is provided in or on said central bar and oriented substantially parallel to its longitudinal axis, and at least one bulb containing a bubble is provided in or on an arm member and oriented substantially parallel to its longitudinal axis wherein each arm member comprises a distal end and a proximal end and is pivotally coupled at its respective proximal end to an end of said central bar so as to be pivotal toward and away from a respective one of the opposing longitudinal side edges of said central bar.

2. A spirit level according to claim 1, wherein one or more of said arm members comprises a respective extension member, mounted for movement relative thereto between a first, retracted position and a second, extended position wherein it forms an extension to the length of said respective arm member.

3. A spirit level according to claim 2, wherein said extension member is slidably mounted on a respective arm member for longitudinal sliding movement relative thereto, between said first and second positions.

4. A spirit level according to claim 3, wherein said extension member comprises an elongate longitudinal slot by which said extension member is mounted on a protrusion provided on said respective arm member, wherein said sliding movement is effected, in use, by sliding a side edge of said slot longitudinally over said protrusion.

5. A spirit level according to claim 1, wherein each arm member is mounted at a respective end of said central bar by means of a hinge member.

6. A spirit level according to claim 5, wherein said hinge member is substantially cuboidal with a semi-cylindrical portion, said semi-cylindrical portion comprising a hole through the depth of the hinge for the accommodation of a fastener.

7. A spirit level according to claim 1, wherein said arm members are coupled to the respective end of said central bar such that they lie substantially flush against said central bar when in said second configuration, and substantially perpendicular relative to the longitudinal axis of the central bar, when in said first configuration.

8. A spirit level according to claim 1, comprising a releasable holding means for releasably holding said arm members in said second configuration.

9. A spirit level according to claim 8, wherein said releasable holding means comprises a first magnetic portion provided on a side edge of said central bar and a second magnetic portion provided on an arm member, on said side edge located against or adjacent to said side edge of said central bar, when in said second configuration.

10. A spirit level according to claim 1, wherein, in said first configuration, the proximal ends of each of a pair of arm members are substantially flush with each other.

11. A spirit level according to claim 10, wherein said proximal ends of one or both of a pair of arm members is provided with a friction surface for enabling said proximal ends to engage with each other, in a friction fit, when said arm members are in said first configuration.

12. A spirit level according to claim 11, wherein said friction surface comprises a serrated surface.

* * * * *